P. H. Stauffer,
Manure Fork.
No 86109.  Patented Jan. 19, 1869.
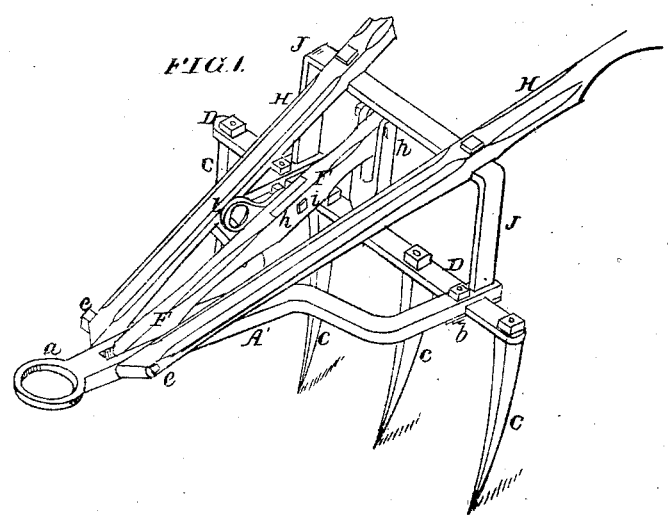
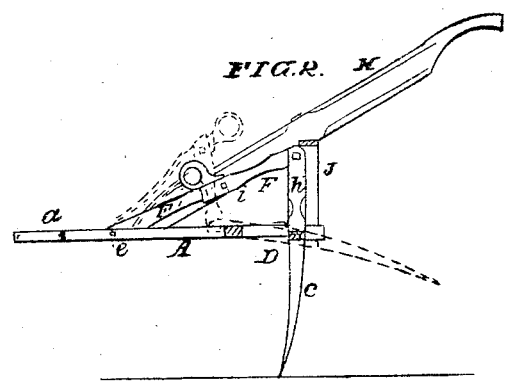
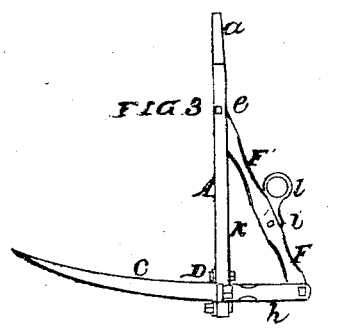
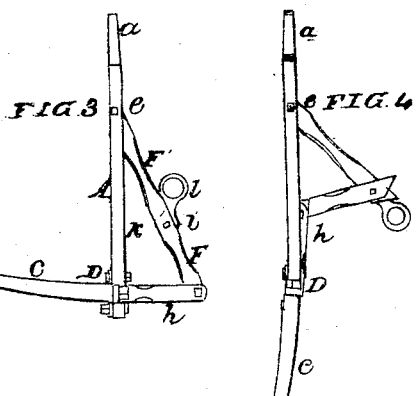
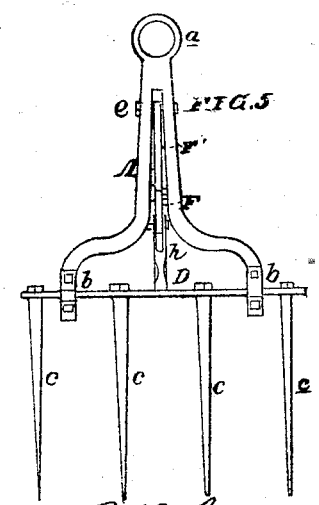
Witnesses: John Parker, Thos. McIlvain
P. H. Stauffer
By his Atty

United States Patent Office.

P. H. STAUFFER, OF LEHIGHTON, PENNSYLVANIA, ASSIGNOR TO HIMSELF, EDWARD MAURY, AND WILLIAM L. LANDS.

Letters Patent No. 86,109, dated January 19, 1869.

IMPROVEMENT IN COMBINED HAY-ELEVATOR AND MANURE-DRAG.

The Schedule referred to in these Letters Patent and making part of the same.

*To all whom it may concern:*

Be it known that I, P. H. STAUFFER, of Lehighton, Carbon county, Pennsylvania, have invented a Combined Manure-Drag and Hay-Elevator; and I do hereby declare the following to be a full, clear, and exact description of the same.

My invention consists of an implement, fully described hereafter, which is so constructed and arranged, that, by a slight adjustment of its parts, it can be made to serve either as a manure-drag or hay-elevator.

In order to enable others skilled in the art to make and apply my invention, I will now proceed to describe the mode of constructing and using the same, reference being had to the accompanying drawing, which forms a part of this specification, and in which—

Figure 1 is a perspective view of the implement, as it appears when in use as a manure-drag;

Figure 2, a sectional view of the same;

Figure 3, a side view of some of the parts detached, and the implement arranged for elevating hay;

Figure 4, the same, with the working-parts in a different position; and

Figure 5, a front view of fig. 4.

Similar letters refer to similar parts throughout the several views.

The frame of the implement consists of a metal yoke, A, having at its front end an eye, $a$, and at its rear end bearings $b\ b$, fig. 5, in which is arranged to turn a transverse bar, D, the latter being furnished with any convenient number of teeth, $c$, which are so bolted or otherwise secured to the said bar as to be detachable therefrom.

At the opposite side of the bar D is a forked arm, $h$, to the outer end of which is hung a rod, F; and a rod, F', which is arranged to turn upon a bolt, $e$, close to one end of the frame, is jointed to the rod F by a pin, $i$. An arm, $l$, is also hung to the pin $i$, for a purpose described hereafter.

The ends of the rods F and F' are fitted to each other, being each cut away so as to form inclined shoulders and recesses, $k$, of such a character as to prevent the said rods, when brought to the position shown in fig. 1, from being turned upon the pin $i$ in any direction except that indicated by the arrow.

In consequence of this arrangement, the rods F and F' act as a rigid bar, and effectually prevent any change of position of the bar D and its teeth, until the rods themselves are first turned slightly upon their pin $i$.

Two handles, H H, are attached to the yoke A (so as to be readily detached from the same) by a brace, J, bolted to the rear ends of the yoke, and by the same bolt, $e$, to which the rod F is jointed.

The implement, as above described, is used as a manure-drag, the traces of a horse being hitched to the eye $a$, and the teeth $c$ dragged over the manure.

When a sufficient quantity of manure has been collected in front of the teeth, the attendant, who directs the drag by means of the handles H, raises the arm $l$, and slightly lifts the arms F and F' above a horizontal line, the bar D and its teeth being then, by the weight of the accumulated mass, turned back to the position shown by red lines in fig. 2.

After this the rods F and F' are depressed, and the teeth brought to their former position, the operation being then continued until a second mass has been accumulated, which is also discharged in the manner described, the rods F and F' in every case holding the teeth firmly, and preventing them from turning back until properly operated.

When the implement has to be used as a hay-elevator, the handles H H and their brace J are detached. The apparatus is then inverted, as shown in fig. 3, and suspended by its eye $a$ to the usual hoisting-tackle, and an operating-cord is secured to the outer end of the arm $l$.

The operation of the hay-elevator does not differ materially from those in common use, a mass of hay being loaded upon the prongs $c$, raised to the desired point, and discharged by operating the arm $l$, which, as in the previous instance, turns the locking-rods F and F' outward, and permits the prongs to be turned downward by the weight of the mass of hay, until the latter falls. (See fig. 4.)

The teeth or prongs $c$ are, as before described, threaded at one end, and secured to the cross-bar D by suitable nuts, so that, if it be desired, short stout teeth may be used for dragging manure, while, when the apparatus is arranged as a hay-elevator, the usual curved prongs may be employed.

I claim as my invention, and desire to secure by Letters Patent—

The detachable handles H H, and movable pronged cross-bar D, in combination with the yoke or frame A, and with the rods F F' or their equivalents, substantially as and for the purpose described.

In testimony whereof, I have signed my name to this specification, in the presence of two subscribing witnesses.

P. H. STAUFFER.

Witnesses:
H. HOWSON,
H. SMITH.